(12) United States Patent
Amir

(10) Patent No.: US 8,223,014 B2
(45) Date of Patent: Jul. 17, 2012

(54) ENERGY-CONSERVING TRIGGERED ID SYSTEM AND METHOD

(75) Inventor: Haim Amir, Ramat Hasharon (IL)

(73) Assignee: Essence Security International Ltd., Herzliya (IL)

( * ) Notice: Subject to any disclaimer, the term of this patent is extended or adjusted under 35 U.S.C. 154(b) by 322 days.

(21) Appl. No.: 12/166,328

(22) Filed: Jul. 2, 2008

(65) Prior Publication Data

US 2010/0001855 A1    Jan. 7, 2010

(51) Int. Cl.
*G08B 1/08*    (2006.01)

(52) U.S. Cl. ..................... 340/539.3; 235/375

(58) Field of Classification Search .... 340/572.1–572.9; 235/375–385
See application file for complete search history.

(56) References Cited

U.S. PATENT DOCUMENTS

| | | | | |
|---|---|---|---|---|
| 5,030,941 A * | 7/1991 | Lizzi et al. | ..................... | 340/541 |
| 5,682,032 A * | 10/1997 | Philipp | ..................... | 235/422 |
| 5,917,291 A * | 6/1999 | Soules et al. | ..................... | 315/248 |
| 6,150,948 A * | 11/2000 | Watkins | ..................... | 340/693.3 |
| 6,223,988 B1 * | 5/2001 | Batterman et al. | ....... | 235/472.01 |
| 6,323,769 B1 * | 11/2001 | Dames | ..................... | 340/572.2 |
| 6,476,708 B1 | 11/2002 | Johnson | | |
| 6,669,089 B2 * | 12/2003 | Cybulski et al. | ..................... | 235/385 |
| 6,917,291 B2 * | 7/2005 | Allen | ..................... | 340/572.1 |
| 7,292,628 B2 | 11/2007 | Koerner et al. | | |
| 7,503,484 B2 | 3/2009 | Jain et al. | | |
| 7,518,518 B2 * | 4/2009 | Homanfar et al. | ..................... | 340/572.1 |
| 7,522,878 B2 | 4/2009 | Baarman | | |
| 2003/0061085 A1 | 3/2003 | Lanigan, Sr. | | |
| 2006/0079180 A1 * | 4/2006 | Sinivaara | ..................... | 455/41.2 |
| 2008/0084276 A1 | 4/2008 | Bauchot et al. | | |
| 2009/0015376 A1 * | 1/2009 | Xiang et al. | ..................... | 340/10.1 |

FOREIGN PATENT DOCUMENTS

| | | |
|---|---|---|
| DE | 102005019306 | 11/2006 |
| EP | 0535919 | 4/1993 |
| FR | 2898201 | 9/2007 |

* cited by examiner

*Primary Examiner* — George Bugg
*Assistant Examiner* — Edny Labbees
(74) *Attorney, Agent, or Firm* — Mark M Friedman

(57) ABSTRACT

An energy-conserving triggered ID system, comprising: a reading assembly having a normally non-activated state and having a triggered subassembly configurable to activate the reading assembly; and a mobile assembly having no power source and having a triggering subassembly configurable to activate the triggered subassembly when the mobile assembly is located within a triggering range, wherein the reading assembly is operable to transfer power to the mobile assembly and wherein data transfer is effected between the mobile assembly and the reading assembly within a data transfer range.

17 Claims, 2 Drawing Sheets

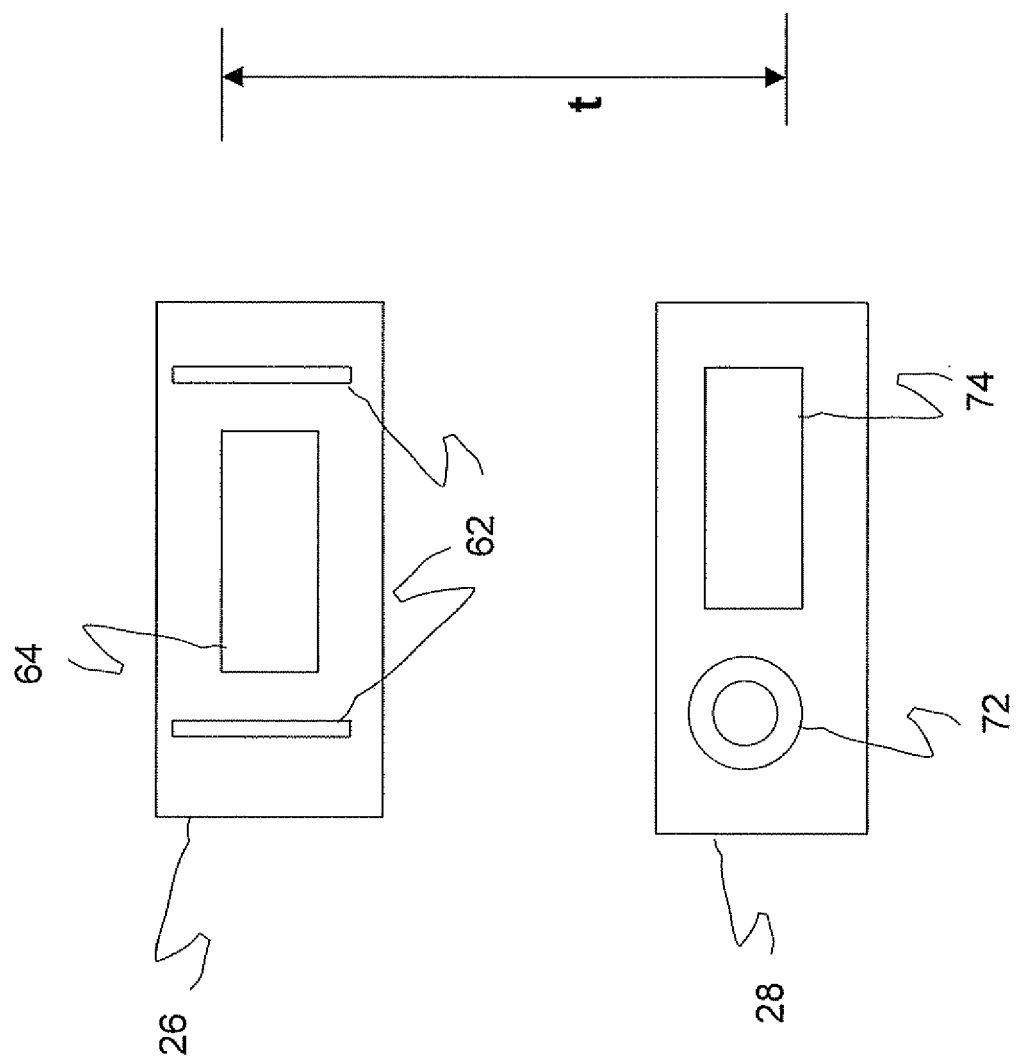

ENERGY-CONSERVING TRIGGERED ID SYSTEM AND METHOD

FIELD AND BACKGROUND OF THE INVENTION

The present invention relates to an energy-conserving triggered ID system and method, and in particular, it concerns a system and method for an ID reader having long standby and overall long battery life.

In the description and claims with follow hereinbelow, the expression "ID system" is intended to mean any system that can discriminate a specific user and/or some general system commands (such as, but not limited to "on", "off", "pause", and "resume") from a user of the system. Typically, the ID system must initially identify/verify the user in order to subsequently receive commands from the user. Identification, verification, and/or discrimination may be effected by wired or wireless means.

A radio frequency identification (RFID) tag is an example of a component of a prior art ID system employing a wireless means. When interrogated by a reading device (another component of a prior art ID system) which is also denoted as an "interrogator" or as a "reader", the RFID tag reflects or retransmits a radio frequency signal to return an encoded identification number or identifier to the interrogator. Some typical examples of RFID tag applications are: collection of highway and bridge tolls; worker identification as they enter and exit buildings; management of alarm systems; etc. In the case of toll collection, the RFID tag is positioned on a user's vehicle to respond to an interrogation signal as the vehicle passes through a toll collection point. An interrogator, communicating with a computer, reads and subsequently processes the tag identification number, which is in turn used to charge a toll to the user's credit card or other account.

Prior art RFID tag devices employ a number of optional technologies, some employing some type of on-board circuitry. A most daunting problem with such RFID tags is the need for DC power for the circuitry. The combination of environmental issues coupled with severe constraints on costs, size and weight usually requires that the tag not have a battery or other onboard power source. The only generally useable solution in this case is to obtain DC power by converting RF power received from the tag reader signal into DC power within the tag. In the specification and the claims with follow, a tag without a battery or other onboard power source is called a "passive tag" or employing the "passive method".

Bauchaud et al, in US Patent Publication no. 20080084276, whose disclosure is incorporated herein by reference, describes a radio frequency identification (RFID) tag and a method and system for communicating with the RFID tag. An electromagnetic radio frequency signal is transmitted from an interrogator to the REID tag. The interrogator receives, from the RFID tag, a response signal including third data being the first data or a combination of the first data and the second data. The interrogator extracts the third data from the response signal. A default value equal to the combination of the first data and the second data is stored in the interrogator. If the interrogator determines that the third data is unequal/equal to the default value, then a screen of the interrogator displays that the RFID tag is enabled/not enabled.

Passive tags as described hereinabove depend on the tag receiving interrogation and subsequent powering signals from the reader/interrogator. Virtually all ID systems employ a stationary reader/interrogator, which, in addition to communicating with the passive tag, frequently has additional communications functionality with one or more systems. Interrogators are typically powered by mains power to provide sufficient/unlimited power for interrogation, communication, and other functions. In such cases, the interrogation signal, as well as other communications functions, may be operated nearly continuously—as specific interrogator power consumption is of marginal or of no interest in terms of the overall ID system operation.

However, there is may be a need for an interrogator to be remotely located and/or to be installed where there is no available mains power source; meaning the interrogator has a self-contained power source, such as a battery. Such installations also have significant cost advantages in that installation is quick and very flexible, in virtually any location. However, a battery-powered integrator has constraints on its operation to conserve battery power and ensure long operation life. One example of such a constraint is that interrogation and other signals must be controlled/minimized to conserve power and extend battery life. Likewise, other types of interrogators and ID systems, working with RF energy and/or other communications means, wired and/or wireless, and working with any combination of battery and/or mains power, may be more efficient and/or more optimally operated if signals and operation parameters are likewise better controlled.

There is therefore a need for an energy-conserving D system that has long standby life $_{[GT1]}$ and overall long battery life.

SUMMARY OF THE INVENTION

The present invention relates to an energy-conserving triggered ID system and method, and in particular, it concerns a system and method for an ID reader having long standby life $^{[GT2]}$ and overall long battery life.

According to the teachings of the present invention there is provided, an energy-conserving triggered ID system, comprising: a reading assembly having a normally non-activated state and having a triggered subassembly configurable to activate the reading assembly; and a mobile assembly having no power source and having a triggering subassembly configurable to activate the triggered subassembly when the mobile assembly is located within a triggering range, wherein the reading assembly is operable to transfer power to the mobile assembly and wherein data transfer is effected between the mobile assembly and the reading assembly within a data transfer range. Most preferably, the reading assembly is deactivatable $_{[GT3]}$ upon completion of data transfer. Preferably, the reading assembly is powerable by a battery and/or by mains power. Typically, the data transfer range is at least the same as the triggering range. Most typically, the mobile assembly is an RFID device.

Most preferably, the triggering subassembly includes at least one magnetic unit. Preferably, the magnetic unit is a permanent magnet. Most typically, the triggered subassembly includes at least one magnetically activated switch/sensor. Typically, the ID system is operable to use power from the battery for at least one year.

According to the teachings of the present invention there is further provided a method of operating an energy-conserving triggered ID system, comprising the steps of: configuring a reading assembly having a normally non-activated state and having a triggered subassembly to activate the reading assembly; taking a mobile assembly having no power source and having a triggering subassembly to activate the triggered subassembly when the mobile assembly is located within a triggering range; and operating the reading assembly to transfer power to the mobile assembly and effecting data transfer between the mobile assembly and the reading assembly within a data transfer range. Most preferably, the reading assembly is deactivated upon completion of data transfer. Preferably, the reading assembly is powered by a battery and/or mains power. Most typically, the data transfer range is at least the same as the triggering range. Typically, the mobile assembly is an RFID device. Typically, the triggering subassembly includes at least one magnetic unit.

Most preferably, the magnetic unit is a permanent magnet. Preferably, the triggered subassembly includes at least one magnetically activated switch/sensor. Most typically, the ID system operates from the battery for at least one year.

BRIEF DESCRIPTION OF THE DRAWINGS

The invention is herein described, by way of example only, with reference to the accompanying drawings, wherein:

FIG. 2 is a schematic diagram of the triggered subassembly and the triggering subassembly, in accordance with an embodiment of the present invention.

DESCRIPTION OF PREFERRED EMBODIMENTS

Figure 1:
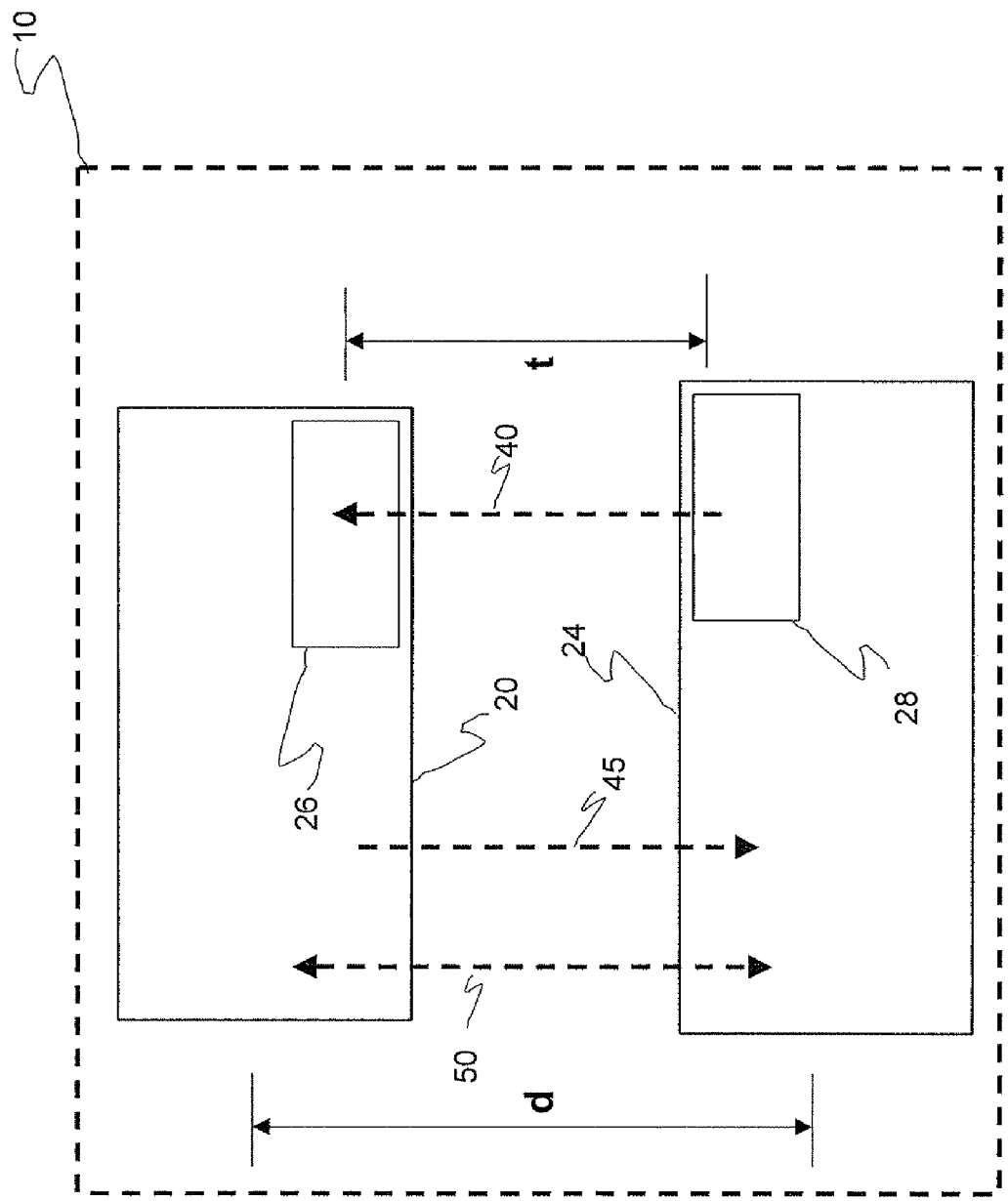
FIG. 1 $_{[GT4]}$ is a block diagram representation of an energy-conserving triggered ID system, in accordance with an embodiment of the present invention.

The present invention relates to an energy-conserving triggered ID system and method, and in particular, it concerns a system and method for an ID reader having long standby and overall long battery life.

Reference is now made to FIG. 1, which is a block diagram representation of an energy-conserving triggered ID system 10, in accordance with an embodiment of the present invention. The ID system comprises a reader assembly 20 and a mobile assembly 24. Typically, the reader assembly is stationary and may be mounted to a structure, such as a wall or other support; however such stationary mounting is not mandatory. Mobile assembly 24 is typically in the form of a lightweight mobile unit and the mobile assembly does not have its own power source. Reader assembly 20 includes, inter alia, a triggered subassembly 26. The triggered subassembly is configured to activate the reading assembly, which is normally not activated, meaning the reading assembly does not normally substantially consuming power. In one embodiment of the current invention, reader assembly 20 has its own on-board battery power (the battery not shown in the figure). In another embodiment of the current invention, reader assembly 20 may be alternatively or additionally connected to mains power (not shown in the figure).

Mobile assembly 24 includes a triggering subassembly 28, which is configured to activate triggered subassembly 26, as shown schematically by a dashed arrow 40 (i.e. "trigger 40") when the mobile assembly is located within a triggering range denoted as "t" in the figure. When triggered subassembly 26 is activated by triggering subassembly 28, reader assembly 20 is activated. Additional information regarding the configuration and functioning of triggered subassembly 26 and triggering subassembly 28 are provided hereinbelow, refer to FIG. 2.

Power transfer 45 from reader assembly 20 to mobile assembly 24 takes place following activation of reader assembly by the triggering subassembly. Data transfer 50 is then subsequently enabled between the reader assembly and the mobile assembly within a data transfer range, denoted as "d". In an embodiment of the present invention, following activation of reader assembly 20, power transfer 45, followed by data transfer 50 take place using wireless means, such as, but not limited to RF. One power transfer 45 has begun (i.e. mobile assembly is initially within triggering range t) and the mobile assembly is maintained within data transfer range d, data transfer 50 continues. Typical ranges for d are similar to ranges typically known in the art for RFID or infra red applications, namely from nearly zero to meters or more.

Although the time for data transfer may vary widely, a typical range of time for data transfer is approximately one second or less. Data transfer 50 may include, but is not limited to, one or more interrogation signals being sent from the reader assembly to the mobile assembly and one or more response/identification signals being sent from the mobile assembly to the reader assembly. In this way, mobile assembly 24 is identified/verified by reader assembly 20, providing some command function and/or enabling additional subsequent data transfer and commands.

When data transfer 50 is complete, power transfer 45 is stopped and reader assembly 20 is deactivated, thereby saving reader assembly 20 power. Logic/software control of the reader assembly (not shown in the figures) may be used in embodiments of the current invention to control how reader assembly 20 is reactivated, such as, but not limited to, when triggered subassembly 26 is continuously maintained within triggering range $t_{[GT5]}$ In such a case, the reader assembly is not activated by triggered subassembly 26. In this way, power consumption of reader assembly 20 is minimized in that the data transfer and power transfer—both functions using power—are minimized and controlled.

Embodiments of the present invention may also include a wired connection (not shown) between reader assembly 20 and mobile assembly 24. In the case of the wired connection, power transfer 45 to mobile assembly 24 and data transfer 50 to and from the mobile assembly takes advantage of the wired connection.

In an embodiment of the present invention mobile assembly 24 can any one of: an RFID tag, card, key fob, and any ID device as known in the art having a form factor to allow it to be easily carried (i.e. "mobile").

Reference is now made to FIG. 2, which is a schematic diagram of triggered subassembly 26 and triggering subassembly 28, in accordance with an embodiment of the present invention. Triggering subassembly 28 includes, inter alia, one or more magnetically-sensitive switches 62 and a transceiver/CPU subassembly 64. Triggering subassembly 28 includes, inter alia, at least one magnetic unit 72 and an RF power-transceiver subassembly 74. In an embodiment of the current invention, magnetic unit 72 may be a compact permanent magnet, such as, but not limited to a thin circular or a thin strip magnet, both as known in the art. The shape of magnetic unit 72 is chosen to allow a compact form factor for the triggering subassembly and the mobile assembly shown in FIG. 1.

As indicated in the figure and described hereinabove, when triggering subassembly 28 is positioned within triggering range d, the triggering subassembly causes triggered subassembly 26 to activate the reader assembly shown in FIG. 1. Magnetic unit 72 and the one or more magnetically-sensitive switches 62 are chosen so that the one or more magnetically-sensitive switches sense the magnetic field of magnetic unit 72 when the magnetic unit is positioned within range d. In this way, the triggered subassembly is triggered when the triggering subassembly is positioned within range d.

In embodiments of the current invention, a typical battery lifetime for the reader assembly is 1-3 years and up to the lifetime of the mobile assembly. Possible applications for the energy-conserving triggered ID system described hereinabove include: alarm and security systems; worker and personnel control and/or accounting systems; or any other similar system that has a need to identify equipment, personnel, and/or animals.

It will be appreciated that the above descriptions are intended only to serve as examples, and that many other embodiments are possible within the scope of the present invention as defined in the appended claims.

What is claimed is:

1. An energy-conserving triggered ID system, comprising:
   a. a reading assembly having a normally non-activated state and having a triggered subassembly configurable to activate the reading assembly;
   b. a mobile assembly having no power source and having a triggering subassembly configurable to activate the triggered subassembly when the mobile assembly is located within a triggering range, said triggering subassembly including a permanent magnet; and
   c. the reading assembly when triggered is operable to transfer power to the mobile assembly and data transfer is effected between the mobile assembly and the reading assembly within a data transfer range.

2. An ID system according to claim 1, wherein the reading assembly is deactivatable upon completion of data transfer.

3. An ID system according to claim 2, wherein the reading assembly is powerable by a battery or by mains power.

4. An ID system according to claim 3, wherein the data transfer range is at least the same as the triggering range.

5. An ID system according to claim 4, wherein the mobile assembly is an RFID device.

6. An ID system according to claim 1, wherein said reading assembly consumes substantially no power in said normally non-activated state.

7. An ID system according to claim 3, wherein the ID system is operable to use power from a battery for at least one year.

8. A method of operating an energy-conserving triggered ID system, comprising the steps of:
   a. configuring a reading assembly having a normally non-activated state and having a triggered subassembly to activate the reading assembly, in said normally non-activated state said reading assembly consuming no power;
   b. taking a mobile assembly having no power source and having a triggering subassembly to activate the triggered subassembly when the mobile assembly is located within a triggering range;
   c. operating the reading assembly to transfer power to the mobile assembly and effecting data transfer between the mobile assembly and the reading assembly within a data transfer range; and
   d. once data transfer is completed, deactivating said reader assembly into said normally non-activated state, the non-activated state continues until reactivation.

9. The method of claim 8, wherein the reading assembly is powered by a battery or by mains power.

10. The method of claim 9, wherein the data transfer range is at least the same as the triggering range.

11. The method of claim 10, wherein the mobile assembly is an RFID device.

12. The method of claim 11, wherein the triggering subassembly includes at least one magnetic unit.

13. The method of claim 12, wherein the magnetic unit is a permanent magnet.

14. The method of claim 8, wherein the triggered subassembly includes at least one magnetically activated switch/sensor.

15. The method of claim 9, wherein the ID system operates from a battery for at least one year.

16. A method of operating an energy-conserving triggered ID system, comprising the steps of:
   a. configuring a reading assembly having a normally non-activated state and having a triggered subassembly;
   b. taking a mobile assembly having no power source and having a triggering subassembly to activate the triggered subassembly when the mobile assembly is located within a triggering range, said triggering subassembly including a permanent magnet; and
   c. operating the reading assembly to transfer power to the mobile assembly and effecting data transfer between the mobile assembly and the reading assembly within a data transfer range.

17. An energy-conserving triggered ID system, comprising:
   a. a reading assembly having a normally non-activated state and having a triggered subassembly configurable to activate the reading assembly, said reading assembly consuming no power in said normally non-activated state;
   b. a mobile assembly having no power source and having a triggering subassembly configurable to activate the triggered subassembly when the mobile assembly is located within a triggering range; and
   c. the reading assembly when triggered is operable to transfer power to the mobile assembly and data transfer is effected between the mobile assembly and the reading assembly within a data transfer range, wherein once data is transfer is completed, said reader assembly is deactivating into said normally non-activated state, the normally non-activated state continuing until reactivation.

* * * * *